United States Patent
Hoerschler et al.

(10) Patent No.: US 11,247,535 B2
(45) Date of Patent: Feb. 15, 2022

(54) AIR VENT FOR A MOTOR VEHICLE

(71) Applicant: Bayerische Motoren Werke Aktiengesellschaft, Munich (DE)

(72) Inventors: Ingolf Hoerschler, Munich (DE); Anna Rahm, Munich (DE); Stefan Zemsch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 206 days.

(21) Appl. No.: 16/428,363

(22) Filed: May 31, 2019

(65) Prior Publication Data

US 2019/0283543 A1   Sep. 19, 2019

Related U.S. Application Data

(63) Continuation of application No. PCT/EP2018/053796, filed on Feb. 15, 2018.

(30) Foreign Application Priority Data

Mar. 1, 2017   (DE) .................. 10 2017 203 334.7

(51) Int. Cl.
*B60H 1/34*    (2006.01)
*B60H 1/00*    (2006.01)

(52) U.S. Cl.
CPC ....... *B60H 1/3407* (2013.01); *B60H 1/00564* (2013.01); *B60H 1/3414* (2013.01)

(58) Field of Classification Search
CPC ... B60H 1/3414; B60H 1/3421; B60H 1/3407
(Continued)

(56) References Cited

U.S. PATENT DOCUMENTS 5,259,815 A    11/1993    Stouffer et al.
5,954,577 A *   9/1999    Meckler .............. B60H 3/0625
                                                                454/75
(Continued)

FOREIGN PATENT DOCUMENTS

DE    297 16 410 U1    12/1997
DE    298 24 623 U1    1/2002
(Continued)

OTHER PUBLICATIONS

International Search Report (PCT/ISA/210) issued in PCT Application No. PCT/EP2018/053796 dated May 29, 2018 with English translation (six (6) pages).
(Continued)

*Primary Examiner* — Vivek K Shirsat
*Assistant Examiner* — Ko-Wei Lin
(74) *Attorney, Agent, or Firm* — Crowell & Moring LLP

(57)   ABSTRACT

For air-conditioning within a vehicle interior of a motor vehicle, an air vent is provided with at least one air-directing device located in the region of an air outlet opening. The air vent is configured to allow air flowing out of the air outlet opening to flow, by way of the Coanda effect, in a directed manner along a surface which is adjacent to the air outlet opening. The air-directing device and the adjacent surface are inclined in relation to each other by an angle of inclination which is between 23° and 27°, and the directed air has a volumetric flow of between 30 m³/h and 700 m³/h.

10 Claims, 2 Drawing Sheets

(58) Field of Classification Search
USPC .......................................................... 454/155
See application file for complete search history.

(56) References Cited

U.S. PATENT DOCUMENTS

| | | | | |
|---|---|---|---|---|
| 2010/0124876 | A1* | 5/2010 | Yu ........................... | F24F 13/06 |
| | | | | 454/155 |
| 2010/0304655 | A1* | 12/2010 | Nagasaka ............ | B60H 1/3421 |
| | | | | 454/152 |
| 2012/0276833 | A1* | 11/2012 | Wittorf ................ | B60H 1/3421 |
| | | | | 454/155 |
| 2013/0344791 | A1* | 12/2013 | Wang ................. | B60H 1/00828 |
| | | | | 454/155 |
| 2016/0176264 | A1* | 6/2016 | Jablonski ........... | B60H 1/00985 |
| | | | | 165/203 |
| 2017/0021692 | A1 | 1/2017 | Terai et al. | |

FOREIGN PATENT DOCUMENTS

| | | |
|---|---|---|
| EP | 1 920 955 A1 | 5/2008 |
| FR | 2 406 742 A1 | 5/1979 |
| FR | 3 031 474 A1 | 7/2016 |
| JP | 62-194126 A | 8/1987 |
| WO | WO 83/04290 A1 | 12/1983 |
| WO | WO 2016/158101 A1 | 10/2016 |

OTHER PUBLICATIONS

German-language Written Opinion (PCT/ISA/237) issued in PCT Application No. PCT/EP2018/053796 dated May 29, 2018 (six (6) pages).

German-language Search Report issued in counterpart German Application No. 10 2017 203 334.7 dated Sep. 12, 2017 with partial English translation (13 pages).

* cited by examiner

AIR VENT FOR A MOTOR VEHICLE

CROSS REFERENCE TO RELATED APPLICATIONS

This application is a continuation of PCT International Application No. PCT/EP2018/053796, filed Feb. 15, 2018, which claims priority under 35 U.S.C. § 119 from German Patent Application No. 10 2017 203 334.7, filed Mar. 1, 2017, the entire disclosures of which are herein expressly incorporated by reference.

BACKGROUND AND SUMMARY OF THE INVENTION

The present invention relates to an air vent for a motor vehicle, to an instrument panel having such an air vent, and to a motor vehicle equipped with said air vent.

An air vent for a motor vehicle having at least one air directing device that is situated in the region of an air exit opening is known from US 2017/0021692 A1. The air vent is specified in such a manner that air flowing out of the air exit opening, by means of the Coanda effect, flows so as to be directed along a face that neighbors the air exit opening. The volumetric flow exiting the air exit opening, when viewed in the installed state of the air vent, is directed upward so as to be able to feed air to the upper-body region of a vehicle occupant.

It is an object of the present invention to provide technical means by way of which operation of a generic air vent is enabled in a reliable manner.

The air vent according to the invention for a motor vehicle has at least one air directing device that is located in the region of an air exit opening. The air vent according to the invention permits air flowing out of the air exit opening, by way of the Coanda effect, to flow so as to be directed along a surface adjacent the air exit opening. The air directing device and the adjacent surface are mutually inclined at an inclination angle which is substantially between 23° and 27°, and the directed air has a volumetric flow of substantially between 30 m$^3$/h and 700 m$^3$/h. It is advantageously ensured on account thereof, that the volumetric flow exiting the air vent bears on the adjacent surface and is guided in a defined manner in a specific direction.

According to one preferred embodiment, the air directing device and the adjacent surface are mutually inclined at an inclination angle of substantially 26°, and the directed air has a volumetric flow of substantially between 60 m$^3$/h and 180 m$^3$/h. The air exiting the air exit opening in this case advantageously flows along the inclined face in a particularly stable manner.

According to one further preferred embodiment, the adjacent surface is situated below the air directing installation. On account thereof, it is advantageously possible for the volumetric flow to be directed downward in a simple manner, when viewed in the installed state of the air vent.

A particularly simple construction of the air vent according to the invention is achieved when the air directing device forms a base of the air vent. This base can be configured so as to be flat or curved, in particular be convexly-shaped. Alternatively or additionally, the air directing device can have a pivot axis that is parallel to a base of the air vent, the air directing device being capable of being adjusted about said pivot axis. On account thereof, having the volumetric flow released from the face, or bear on the face, can be advantageously influenced by a user of the air vent.

A particularly aesthetic appearance of the air vent according to the invention is advantageously achieved when the face crossed by the volumetric flow is at least in part an aperture of the air vent.

The aforementioned object is also achieved by an instrument panel which has at least one air vent of the type disclosed above. The aforementioned advantages apply in an analogous manner.

According to one preferred embodiment, the instrument panel according to the invention is distinguished in that the adjacent surface has at least in part an operator part. The operator part thus advantageously serves not only for operating a device that is operatively connected to said operator part, particularly advantageously an air-conditioning system and/or an entertainment device, but simultaneously also as a means for influencing in a desired manner, and a manner based on the Coanda effect, the direction of the volumetric flow leaving the air vent.

The aforementioned object is likewise achieved by a motor vehicle having at least one seat that receives a vehicle occupant, said motor vehicle having an air vent of the type disclosed above or in an instrument panel of the type disclosed above. The aforementioned advantages apply in an analogous manner.

According to one preferred embodiment, the air vent is specified for directing the volumetric flow at least in part to a hip point of the vehicle occupant. The hip point herein is to be understood to be the theoretical hip point, also referred to as the R point or seating reference point (SgRP), which is measured according to the testing method as per standard SAE J 826 of the Society of Automotive Engineers (SAE). On account thereof, it is advantageously possible for the lower region of the vehicle occupant to be swept in a simple manner by the volumetric flow that flows out of the air vent.

The air vent is advantageously situated above a face that is configured as an operator part, wherein the operator part is operatively connected to an air-conditioning system that is situated in the motor vehicle. On account thereof, it is possible for the vehicle occupant to be provided in a simple manner with conditioned air that improves the comfort of travel.

A detailed, nonprejudicial, in particular nonlimiting, description of exemplary embodiments of the present invention is given hereunder with reference to the appended figures which are not to scale. Identical elements have been provided with identical reference signs, unless specified to the contrary.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
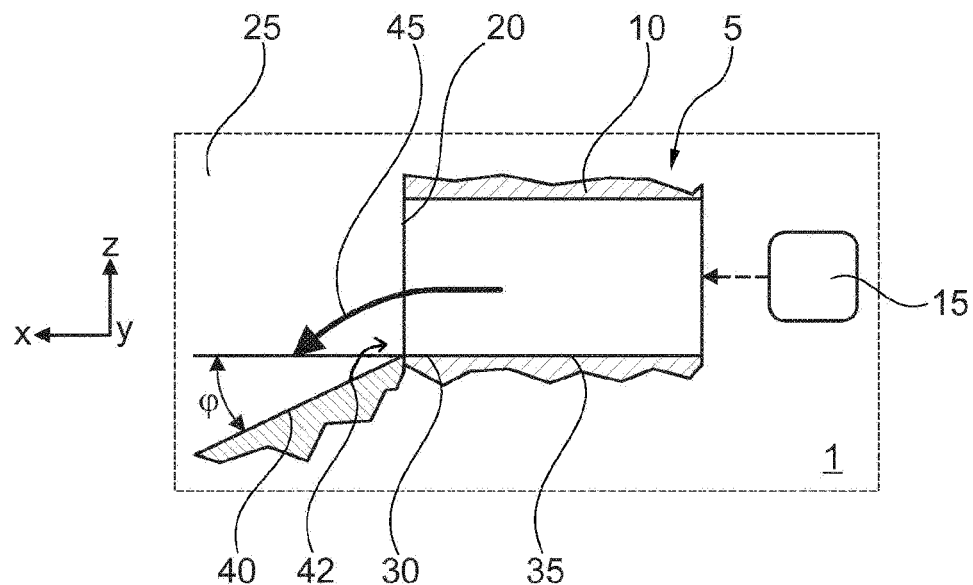
FIG. 1 is a schematic sectional view through an air vent according to an embodiment of the invention, which is situated in a partially illustrated instrument panel of a partially illustrated motor vehicle.

A motor vehicle 1 in which an instrument panel 5 is situated is schematically shown in FIG. 1. The instrument panel 5 has an air vent 10 which, on the entry side, is operatively connected to an air-conditioning system 15 that is located in the motor vehicle 1. An air exit opening 20 by way of which air conditioned by the air-conditioning system 15 can flow into a vehicle interior space 25 is situated on the left side of the air vent 10 in FIG. 1. The conveying of the air according to this exemplary embodiment is performed by way of a blower known per se (not shown here).

The air vent 10 on the lower region thereof in FIG. 1 comprises an air directing device 30 which simultaneously functions as the base 35 of said air vent 10 and by way of which the air that flows in by way of the entry side flows in the direction of the air exit opening 20. A surface 40 by way of which air exiting the air exit opening 20 flows is located below the air exit opening 20, so as to be adjacent the latter. The surface 40 according to this exemplary embodiment is an aperture 42 of the air vent 10; it is however understood that the surface 40 can also perform other functions or can be a component part of another component that is situated in a vehicle interior space 25.

The air vent 10 is specified in such a manner that a volumetric flow 45 of the air, represented by the arrow shown in FIG. 1, exits the air exit opening 20 and, by means of the Coanda effect, sweeps the surface 40 neighboring said air vent 10. For this purpose, the inclination angle φ between the air directing device 30, or the base 35, respectively, and the surface 40 is substantially between 23° and 27°, and the volumetric flow 45 is substantially between 30 m³/h and 700 m³/h. In the exemplary embodiment shown in FIG. 1, the inclination angle φ=26°, and the volumetric flow, depending on the desire of a vehicle occupant (not shown here), is between 60 m³/h and 180 m³/h. It is to be pointed out that the air flowing out of the air exit opening 20 bears on the surface 40 in the case of any arbitrary combination of the inclination angle φ and the volumetric flow 45, as long as the conditions illustrated above in terms of inclination angle φ and the volumetric flow 45 are adhered to.

Figure 2:
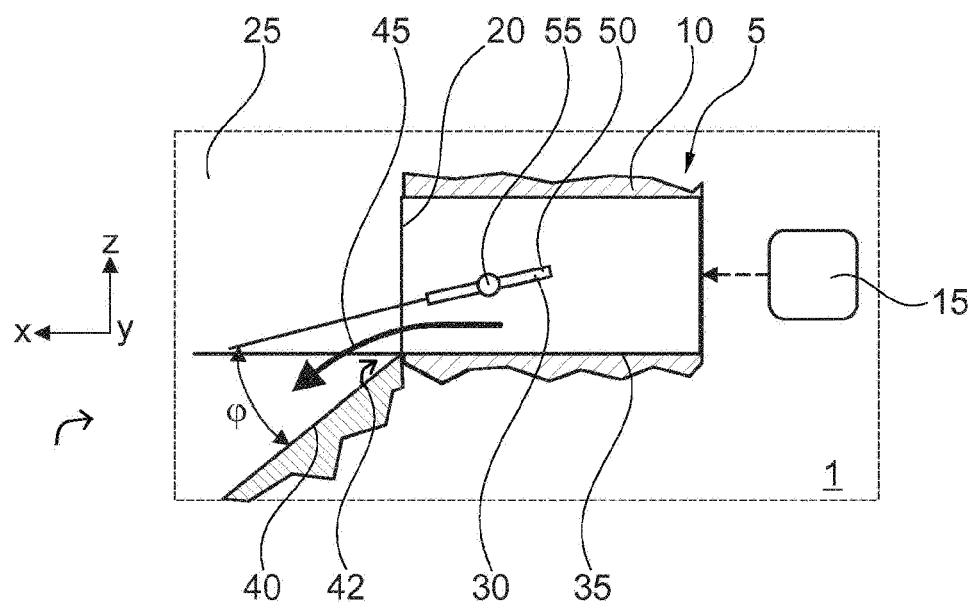
FIG. 2 shows an embodiment as an alternative to FIG. 1.

The inclination angle φ between the air directing device 30, or the base 35, respectively, and the surface 40 is invariable according to the exemplary embodiment shown in FIG. 1. By contrast, an exemplary embodiment having a variable inclination angle φ is illustrated in FIG. 2. In this case, a slat 50 that functions as an air directing device 30 is mounted so as to be pivotable about a pivot axis 55 which is situated in the air vent 10 and is aligned so as to be parallel to the base 35.

Here too, the air vent 10 is specified in such a manner that a volumetric flow 45 of the air, represented by the arrow shown in FIG. 2, exits the air exit opening 20 and by means of the Coanda effect sweeps the surface 40 that neighbors the air exit opening 20. For this purpose, the inclination angle φ between the air direction device 30, or the slat 50, respectively, and the surface 40 is adjustable substantially between 23° and 27°, and the volumetric flow 45 is adjustable substantially between 30 m³/h and 700 m³/h. In the exemplary embodiment shown in FIG. 1, the inclination angle φ=27° and the volumetric flow is substantially between 60 m³/h and 180 m³/h, depending on the desire of a vehicle occupant (not shown here).

It is to be pointed out that the air flowing from the air exit opening 20 of FIG. 2 bears on the surface 40 at any arbitrary combination of the inclination angle φ and the volumetric flow 45, as long as the conditions illustrated above in terms of the inclination angle φ and the volumetric flow 45 are adhered to. In the case of the vehicle occupant no longer desiring a volumetric flow 45 that bears on the surface 40, said vehicle occupant can pivot the inclination angle φ out of the disclosed range. It is thus advantageously possible for a release of the volumetric flow 45 from the surface 40 to be initiated when the inclination angle φ is larger than substantially 27°, in particular is 30° or 35°, wherein the volumetric flow 45 can be substantially between 60 m³/h and 180 m³/h.

Figure 3:
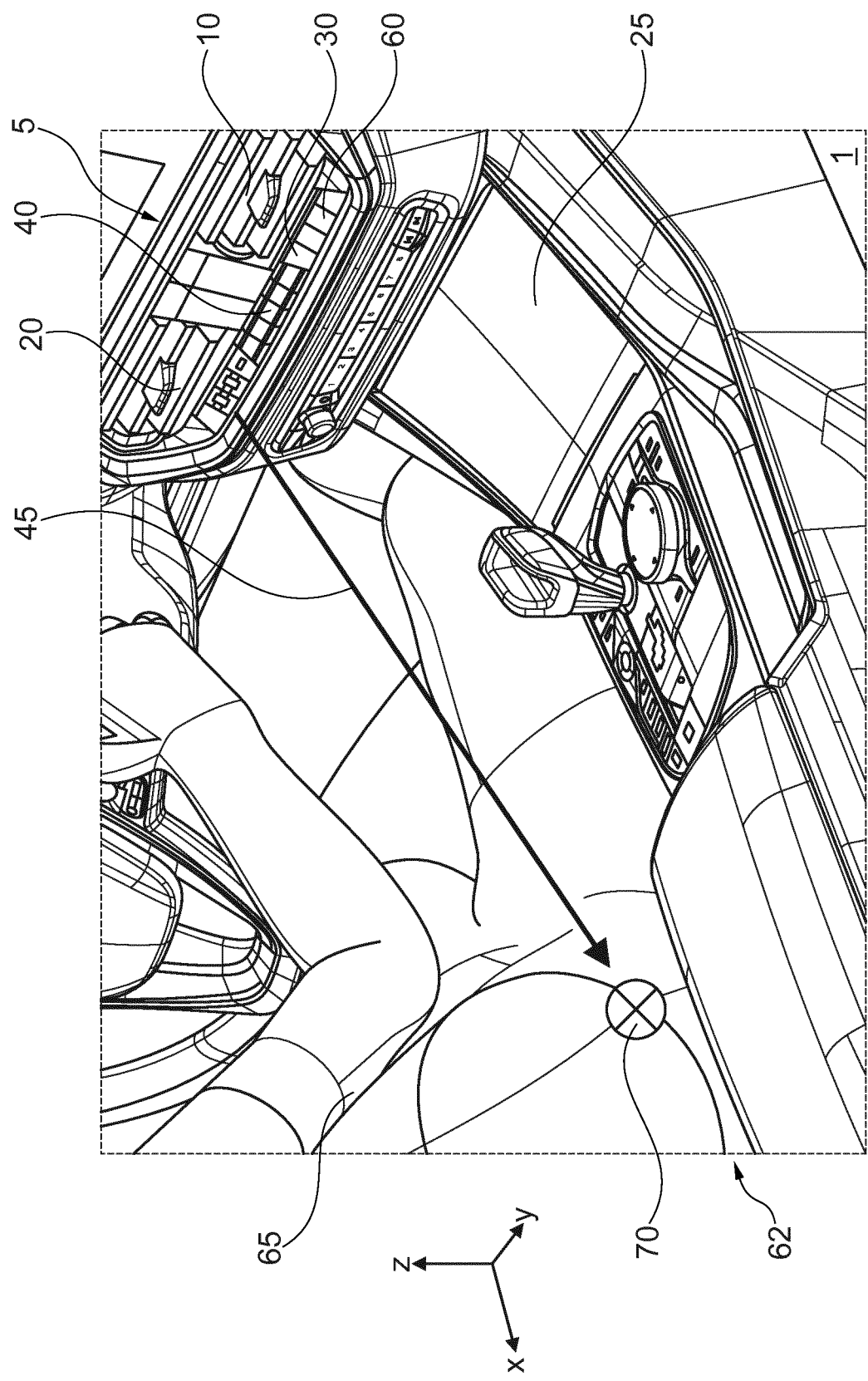
FIG. 3 is a perspective view of a partially illustrated motor vehicle as an alternative to FIGS. 1 and 2.

A perspective view of a partially illustrated motor vehicle according to the invention, as an alternative to FIG. 1 and FIG. 2, is shown in FIG. 3. The surface 40 is configured as an operator part 60, known per se, of an air-conditioning system 15 shown. In order for the comfort of a partially illustrated vehicle occupant 65 who is situated on a seat 62 to be increased, the volumetric flow 45 can be aligned with the hip point 70 of the vehicle occupant 65. This is possible in a simple manner when the air vent 10 is aligned in such a manner that the air flowing out of the air exit opening 20, by means of the Coanda effect, flows across the operator face 60 in the direction of the hip point 70, wherein the following conditions have to be met:

$$23° \leq \text{inclination angle } \varphi \leq 27°, \text{ and}$$

$$30 \text{ m}^3/\text{h} \leq \text{volumetric flow } 45 \leq 700 \text{ m}^3/\text{h}.$$

It is to be understood that the volumetric flow 45 of the exemplary embodiments shown in FIGS. 1 to 3 can be an average volumetric flow 45. Moreover, it is possible for not only a single air directing device 30 but a plurality of the latter to be provided, as long as the conditions illustrated above in terms of the inclination angles φ and the volumetric flows 45 are met.

LIST OF REFERENCE SIGNS

1 Motor vehicle
5 Instrument panel
10 Air vent
15 Air-conditioning system
20 Air exit opening
25 Vehicle interior space
30 Air directing device
35 Base
40 Surface
42 Aperture
45 Volumetric flow
50 Slat
55 Pivot axis
60 Operator part
62 Seat
65 Vehicle occupant
70 Hip point
x, y, z Axes of a vehicle-dedicated Cartesian coordinate system, known per se
φ Inclination angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air vent arranged in an instrument panel of a motor vehicle, comprising:
    an air directing device that is located in a region of an air exit opening;
    a surface that is adjacent the air exit opening, wherein
    the air directing device and the adjacent surface are inclined in relation to each other by an inclination angle which is between 23° and 27°, the air directing device cooperates with the surface that is adjacent the air exit opening so that when the inclination angle is between 23° and 27° and a volumetric flow of air out of the air exit opening is between 30 m³/h and 700 m³/h the air out of the air exit opening, by way of the Coanda effect, is directed to flow along the adjacent surface, and the adjacent surface comprises an operator part operatable by an operator of the motor vehicle.

2. The air vent according to claim 1, wherein
the air directing device and the adjacent surface are inclined in relation to each other by an inclination angle of 26°, and
the directed air has a volumetric flow of between 60 m³/h and 180 m³/h.

3. The air vent according to claim 1, wherein the adjacent surface is located below the air directing device.

4. The air vent according to claim 1, wherein
the air directing device is a base surface of the air vent and/or has a pivot axis that is parallel to a base of the air vent.

5. The air vent according to claim 1, wherein
the adjacent surface and the air exit opening are part of the air vent.

6. An instrument panel for a motor vehicle, comprising:
at least one air vent according to claim 1, wherein
the at least one air vent is in the instrument panel.

7. A motor vehicle comprising:
at least one seat that receives a vehicle occupant, and
an air vent according to claim 1.

8. The motor vehicle according to claim 7, further comprising the instrument panel having the air vent.

9. The motor vehicle according to claim 7, wherein
the air vent directs the volumetric flow at least in part to a hip point of a vehicle occupant.

10. The motor vehicle according to claim 7, wherein
the air exit opening is located above the adjacent surface that is configured as the operator part, and
the operator part is operatively connected to an air-conditioning system that is situated in the motor vehicle.

* * * * *